Patented June 30, 1936

2,046,142

UNITED STATES PATENT OFFICE 2,046,142

INSULATION COMPOSITION AND PROCESS OF MAKING THE SAME

George Witty, Long Island City, N. Y.

No Drawing. Application July 24, 1935,
Serial No. 32,968

1 Claim. (Cl. 106—18)

The object of my invention is to produce in a simple and inexpensive manner an insulating composition, which is non-inflammable, water-proof and sound-proof.

Various attempts have been made to produce an insulating product, such as board, panels, blocks or similar articles which are not only water-proof but are also non-inflammable or fire-proof, but such efforts have been attended without any great degree of success for the reason that the materials essential for rendering the products fire-resistant, and those for rendering it water-resistant, when brought together react against each other and destroy their respective fire-proofing and water-proofing qualities.

It is among the special purposes of my invention to provide an insulating composition which can be cast, molded or pressed into any desired shape or dimension, which is not only simple and inexpensive, but in which the combined qualities of fire-proofing and water-proofing are efficiently obtained.

The composition is made up of the following ingredients, in approximately the following proportions by weight: 50 parts of sawdust, 25 parts of calcined dolomite, 10 parts of ground slag, 10 parts of pulverized clay and 5 parts of dextrin; and the whole thoroughly mixed. The mixture is then intimately moistened with water sufficient to produce a plastic mass.

This mass may be worked into almost any desired form, depending upon the final use to which the product is to be put. When so formed, pressure should be applied to compact the mass. The amount of pressure depends upon the final product and density sought.

The articles, after being thoroughly compressed, are removed from the molds and transferred into a steam chamber and dried at a temperature of 175° to 250° F. whereupon they will be ready for use. The finished product will have a comparatively smooth glossy finish due to the pulverized clay which acts as a filler for the interstice of the sawdust, and the whole will be firmly bonded together by the binding calcined dolomite and dextrin.

It will be noted that mineral wool in equivalent proportions, may be used in place of sawdust. It is also understood that calcined gypsum may be used in place of the calcined dolomite, provided the proportions of pulverized clay are increased substantially in proportion to the ground slag present.

It will be observed that, although certain materials set forth, the invention is not necessarily limited thereto, but includes other proportions and other materials having similar properties and characteristics.

Having fully described my invention, what I claim as new and desire to secure by Letters Patent is:

An insulating composition consisting essentially of 50 parts of sawdust, 25 parts of calcined dolomite, 10 parts of ground slag, 10 parts of pulverized clay, 5 parts of dextrin, and water in sufficient quantity to form a paste or plastic composition of the desired consistency; and the whole pressed into shape substantially as described, and dried at a temperature of 175° to 250° Fahrenheit.

GEORGE WITTY.